United States Patent
Derouen

(10) Patent No.: US 12,067,535 B2
(45) Date of Patent: Aug. 20, 2024

(54) METHOD FOR DIRECTING, SCHEDULING, AND FACILITATING MAINTENANCE REQUIREMENTS FOR AUTONOMOUS VEHICLE

(71) Applicant: Jeffrey Derouen, Youngsville, LA (US)

(72) Inventor: Jeffrey Derouen, Youngsville, LA (US)

(*) Notice: Subject to any disclaimer, the term of this patent is extended or adjusted under 35 U.S.C. 154(b) by 132 days.

(21) Appl. No.: 17/695,781

(22) Filed: Mar. 15, 2022

(65) Prior Publication Data

US 2022/0207495 A1    Jun. 30, 2022

Related U.S. Application Data

(63) Continuation-in-part of application No. 17/320,076, filed on May 13, 2021, now Pat. No. 11,308,458, and a continuation of application No. 17/108,815, filed on Dec. 1, 2020, now Pat. No. 11,049,079, and a continuation-in-part of application No. 16/002,746, filed on Jun. 7, 2018, now abandoned.

(51) Int. Cl.
    *G06Q 10/20*    (2023.01)
(52) U.S. Cl.
    CPC ................... *G06Q 10/20* (2013.01)
(58) Field of Classification Search
    None
    See application file for complete search history.

(56) References Cited

U.S. PATENT DOCUMENTS

| | | | |
|---|---|---|---|
| 10,579,070 B1* | 3/2020 | Konrardy | B60R 16/0234 |
| 2009/0106036 A1* | 4/2009 | Tamura | G06Q 10/109 |
| | | | 705/305 |
| 2018/0349879 A1* | 12/2018 | High | G06Q 20/3827 |
| 2019/0294427 A1* | 9/2019 | Kassner | B60W 50/00 |
| 2019/0378352 A1* | 12/2019 | Dey | G07C 5/006 |

FOREIGN PATENT DOCUMENTS

CN    108528405 A  *  9/2018  ............ B60S 3/04

* cited by examiner

*Primary Examiner* — Abdhesh K Jha
(74) *Attorney, Agent, or Firm* — Barry Choobin; Patent 360

(57) ABSTRACT

A method for performing automatic maintenance of an autonomous vehicle is disclosed. The method includes receiving a maintenance request from the autonomous vehicle, wherein the maintenance request includes diagnostic data. Further, the method includes analyzing the diagnostic data to identify at least one recommended car service for the autonomous vehicle and comparing a vehicle location against a plurality of facility locations to identify a closest facility from a plurality of maintenance facilities, wherein the plurality of facility locations is associated with the locations of the plurality of maintenance facilities. Further, the method includes receiving a work schedule of the closest facility and generating an appointment reservation with the closest facility in the one or more facility locations based on the received one or more work schedules. Moreover, the method includes sending the appointment reservation to the autonomous vehicle.

15 Claims, 14 Drawing Sheets

METHOD FOR DIRECTING, SCHEDULING, AND FACILITATING MAINTENANCE REQUIREMENTS FOR AUTONOMOUS VEHICLE

CROSS-REFERENCE TO RELATED APPLICATIONS

This application is a continuation-in-part of a U.S. patent application Ser. No. 17/320,076 filed on May 13, 2021, which is a continuation of a U.S. patent application Ser. No. 17/108,815 filed on Dec. 1, 2020, which is a continuation-in-part of a U.S. patent application Ser. No. 16/002,746 filed on Jun. 7, 2018, the contents of all the above applications are incorporated herein by reference in its entirety.

FIELD OF THE INVENTION

The present invention relates to the field of autonomous vehicles and more specifically, the present invention relates to methods and systems for performing maintenance of autonomous vehicles.

BACKGROUND OF THE INVENTION

Known methods for vehicle maintenance are unable to utilize the data acquired by a fully autonomous vehicle to determine the type of maintenance required by the vehicle. Further, conventional methods require intervention by users to navigate the vehicle to an appropriate maintenance facility.

Moreover, the conventional methods are unable to navigate the vehicle via a predetermined path of travel through the maintenance facility in sequential steps in order to receive the maintenance required to fulfill mechanical and safety standards set by a predetermined data set based on one or more of manufacturer requirements, owner requirements, and government regulations.

Therefore, there is a need for improved methods and systems for automatically performing maintenance of autonomous vehicles that may overcome one or more of the abovementioned problems and/or limitations.

SUMMARY

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

According to some aspects, a method for performing automatic maintenance of an autonomous vehicle is disclosed. The method includes receiving, using a communication device, a maintenance request from the autonomous vehicle, wherein the maintenance request includes diagnostic data from an On-Board Computing (OBC) device of the autonomous vehicle. Hereinafter the terms "maintenance request" and "service request" are interchangeable used. Furthermore, the method includes analyzing, using a processing device, the diagnostic data to identify at least one recommended car service for the autonomous vehicle. Yet further, the method includes comparing, using the processing device, a vehicle location against a plurality of facility locations to identify a closest maintenance or service facility from a plurality of maintenance facilities, wherein the plurality of facility locations is associated with the locations of the plurality of maintenance facilities. Further, the method includes receiving, using the communication device, a work schedule of the closest facility. Yet further, the method includes generating, using the processing device, an appointment reservation with the closest facility in the one or more facility locations based on the received one or more work schedules. Moreover, the method includes sending, using the communication device, the appointment reservation to the autonomous vehicle, wherein the appointment reservation includes a time slot and the location of the closest facility.

According to some aspects, a system is disclosed for performing automatic maintenance of an autonomous vehicle. The system includes a communication device configured to receive a maintenance request from the autonomous vehicle, wherein the maintenance request includes diagnostic data from an On-Board Computing (OBC) device of the autonomous vehicle. Further, the communication device is configured to receive a work schedule of a closest facility. Moreover, the communication device is configured to send an appointment reservation to the autonomous vehicle, wherein the appointment reservation includes a time slot and the location of the closest facility. Further, the system includes a processing device configured to analyze the diagnostic data to identify at least one recommended car service for the autonomous vehicle. Further, the processing device is configured to compare a vehicle location against a plurality of facility locations to identify the closest facility from a plurality of maintenance facilities, wherein the plurality of facility locations is related to the locations of the plurality of maintenance facilities. Moreover, the processing device is configured to generate the appointment reservation with the closest facility in the one or more facility locations based on the received one or more work schedules.

In one aspect, disclosed is a system that prioritizes the services of the autonomous vehicles based on criticality of the service request received from the vehicle. The autonomous vehicles which when need a service can be routed, by the system disclosed herein, to the nearest facility or the parking area, based on predetermined set of criteria. For example, if three vehicles which need the service, first needs oil change, the second one needs muffler replacement, and the third needs a breaks replacement, the system based on the trouble codes received from the autonomous vehicles can give priority to the one that has break malfunction. Break malfunction is considered by the system as a mechanical failure and critical as compared to the other service requests, which are mainly maintenance request and does not need immediate assistance.

In one aspect, the disclosed system determines if any of autonomous vehicles is having passengers. If any of the autonomous vehicle is has passengers, the system can instruct the autonomous vehicle having the passengers to the work station despite having lower criticality compared to other service requests.

In one aspect, the system receives two service requests from two autonomous vehicles, a first autonomous vehicle and a second autonomous vehicle. Both service requests can be critical, however, the first autonomous vehicle has at least one passenger, while the second autonomous vehicle has no passenger. The system can instruct the first autonomous vehicle to move to the service center and the second vehicle is instructed by the system to move to the parking lot.

In one aspect, the system receives a first service request from a first autonomous vehicle and a second service request from a second autonomous vehicle. The first service request is related to malfunction of the first autonomous vehicle and the second service request related to maintenance of the second autonomous vehicle. The first autonomous vehicle can be instructed by the system to move to a service station and the second autonomous vehicle is instructed by the system to move a wash station. The service station and the wash station are units within a service center or a maintenance facility. Upon completion of the service of the first autonomous vehicle, the second autonomous vehicle can be instructed to move to the service station.

In one aspect, the system receives a first service request from a first autonomous vehicle, a second service request from a second autonomous vehicle, and a third service request from a third autonomous vehicle. The first service request related to malfunction of the first autonomous vehicle. The second service request related to malfunction of the second autonomous vehicle. The third service request related to maintenance of the third autonomous vehicle. The criticality of the first service request can be higher than the second service request. Accordingly, the system can instruct the first autonomous vehicle to move to a service station, the second autonomous vehicle is instructed to move to a parking lot, and the third autonomous vehicle is instructed to move to a wash station. Upon completion of the service of the first autonomous vehicle, the second autonomous vehicle is instructed to move to the service station.

In one aspect, disclosed is a method for performing automatic maintenance of an autonomous vehicle, the method includes the steps of receiving a plurality of maintenance requests from a plurality of autonomous vehicles, wherein each of the plurality of maintenance requests includes a current location of the autonomous vehicle. Receiving in near real time work schedule of a plurality of service centers. Determining for each autonomous vehicle of the plurality of the autonomous vehicles, drive times to each of the plurality of service centers. Thereafter, determining wait times for each of the plurality of service centers. Total times then be calculated based on the drive times and the wait times; Appointments can be scheduled for each of the plurality of the autonomous vehicles based on the total times.

In one aspect, the method also includes the steps of receiving diagnostic data from an On-Board Computing (OBC) device and navigation data from each of the plurality of the autonomous vehicles, the navigation data including GPS locations of a path traveled by an autonomous vehicle and times the autonomous vehicle was at these GPS locations. Determining environmental conditions at the GPS locations during the associated times, the environmental conditions comprising road condition and weather condition. Analyzing the environmental conditions to obtain one or more adverse events the autonomous vehicle was subjected to. Finally, at least one maintenance service can be identified for each autonomous vehicle based on the one or more adverse events.

In one aspect, a geospatial map is disclosed, which GPS locations and at least one weather condition associated with each of the GPS locations. The geospatial map can be used to determine the one or more adverse events, an autonomous vehicle may be subjected to.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
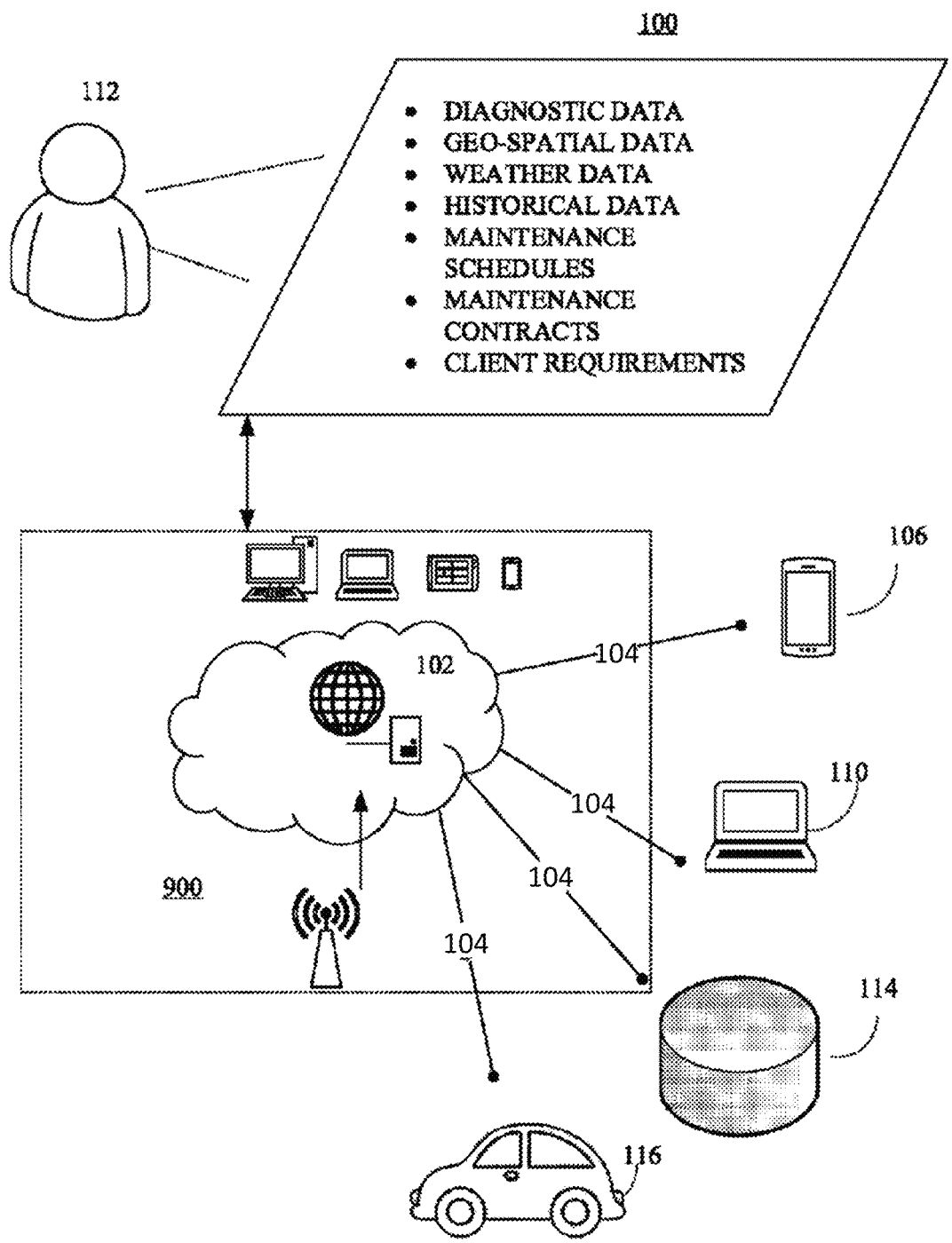
FIG. 1 is a block diagram showing certain embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of autonomous vehicles, in accordance with some embodiments, embodiments of the present disclosure are not limited to use only in this context.

Disclosed is a system, and method for responding to a need of an autonomous vehicle for guidance, inspection, cleaning, and mechanical maintenance of fully autonomous (driver-less) vehicles at a maintenance facility is disclosed. The disclosed system may include a web-based software that may utilize data received from an autonomous vehicle, weather conditions, historical data of the vehicle's maintenance, maintenance schedules of the vehicle, maintenance contracts of the vehicle, and client preferences regarding servicing of the vehicle. The system may alert the autonomous vehicles in its network through internet connectivity with regards to required service. Once a vehicle has entered a service zone of the maintenance facility, the system disclosed herein can receive diagnostic data from the vehicle and may also retrieve historical data of the vehicle's maintenance, maintenance schedules of the vehicle, maintenance contracts of the vehicle, client preferences, and optionally navigation data of the vehicle. The diagnostic data may be analyzed to determine the preliminary service requirements of the vehicle. Further, the vehicle may be instructed to proceed to an inspection station at the maintenance facility. At the inspection station, a visual inspection may be performed to confirm the required services. A job sheet may be prepared by the system based on required services. The job sheet including the list of services and schedule. The schedule may allow the vehicle to travel through a series of maintenance stations addressing the specific needs of the vehicle. For example, the specific needs of the vehicle may include, but are not limited to, charging, fueling, cleanliness, interior conditioning, exterior conditioning, mechanical conditioning, and safety assessment.

Furthermore, a proprietary set of data values may allow the complete assessment of the vehicle with regards to its physical and mechanical condition. The data may be relayed to the vehicle's owner for further instruction. The information generated through the inspection and maintenance process may be of special interested to the owners of vehicles associated with ride-hailing companies. The proprietary data sets may be utilized to assist the ride-hailing companies in rating and determining the appropriate use of the vehicles in their fleets.

According to some embodiments, a method for communicating with and alerting fully autonomous (driverless) vehicles requiring service (cleaning, repair, inspection etc.) is disclosed. The method may identify the maintenance requirements of the vehicles based on vehicle data and a predetermined data set, thus directing the vehicle through a series of inspection and maintenance stations with the ability to communicate requirements to the vehicle's owners through an application on a computer, mobile phone or any other connected device. In further embodiments, the method may utilize diagnostic data from the vehicle, historical data of the vehicle's maintenance, maintenance schedules of the vehicle, maintenance contracts of the vehicle, client preferences, and optionally navigation data of the vehicle.

According to some embodiments, a method and system for assessing, and controlling the maintenance and repair of a fully autonomous vehicle is disclosed. The method includes providing maintenance criteria associated with at least one corresponding station from a plurality of maintenance stations in a maintenance facility. Further, the maintenance criteria may include a planned preventative maintenance (PPM) criterion, wherein the PPM criterion includes a wear-and-tear threshold and is associated with a general maintenance station from the plurality of maintenance stations. Further, the method includes providing a geospatial map, wherein the geospatial map includes a plurality of GPS locations with each of the GPS locations being associated with an at least one road condition. Yet further, the method includes extracting a traveled path from a navigation data with a remote server. The traveled path may include a plurality of traveled GPS locations from the plurality of GPS locations. Further, the method includes analyzing the road condition associated with each of the plurality of traveled GPS locations to determine a wear-and-tear level for the autonomous vehicle with the remote server. Further, the method includes designating the PPM criterion as the met criterion if the wear-and-tear level is greater than the wear-and-tear threshold. Moreover, the method includes navigating the autonomous vehicle to the general maintenance station.

In further embodiments, the method includes providing a maintenance history profile for the autonomous vehicle being managed by the remote server. Further, the method includes providing a plurality of car services, wherein each of the maintenance station is associated with at least one car service from the plurality of car services. Furthermore, the method includes providing a user account for the autonomous vehicle being managed by the remote server. The user account can be assessed from the user computing device. Furthermore, the user account can further be associated with an on-board computing (OBC) device of the autonomous vehicle. Further, the method includes navigating the autonomous vehicle to the evaluation station of the maintenance facility. Further, the method includes receiving an inspection report for the autonomous vehicle from an evaluation station by the remote server. Further, the method includes analyzing one or more of the inspection reports, the maintenance criterion, the performance data, the navigation data, and the maintenance history profile by the remote server to determine at least one recommended service from the plurality of car services. Further, the method includes sending one or more of the recommended services, the inspection report, the maintenance history profile, the plurality of service levels, the performance data, and the met maintenance criterion to the user computing device from the remote server. Further, the method includes prompting the user associated with the user account to select an at least one from the plurality of car services with the user computing device. Furthermore, the method includes receiving at least one owner-selected service with the remote server through the user computing device, wherein the owner-selected service is from the plurality of car services. Further, the method includes navigating the autonomous vehicle to the corresponding station of the owner-selected service with the remote server through the GPS device.

In further embodiments, the method includes providing the maintenance criteria includes a wash criterion, wherein the wash criterion includes a plurality of wash conditions being managed by the remote server. Accordingly, the plurality of maintenance stations includes a car wash station. Further, the method includes providing a geospatial map database being managed by the remote server, wherein the geospatial map database includes a plurality of GPS locations. Further, the method includes providing each of the plurality of GPS locations includes recorded weather data. Further, the method includes extracting a traveled path from the navigation data with the remote server, wherein the traveled path includes a plurality of traveled GPS locations from the plurality of GPS locations. Further, the method includes analyzing the recorded weather data for each of the plurality of traveled GPS locations to identify a met wash condition from the plurality of wash conditions by the remote server. Further, the method includes designating the wash criterion as the met criterion and navigating the autonomous vehicle to the car wash station if the met wash condition is identified.

Referring now to figures, FIG. 1 is an illustration of a platform consistent with various embodiments of the present disclosure. By way of non-limiting example, the online platform 100 for performing automatic maintenance of an autonomous vehicle may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114 and an autonomous car 116 (specifically an On-Board Computing (OBC) device of the autonomous car 116), over a communication network 104, such as, but not limited to, the Internet. Further, users of the platform may include relevant parties such as one or more of autonomous car users, employees at autonomous car manufacturers, autonomous car technicians, and autonomous car maintenance facilities etc. Accordingly, electronic devices operated by the one or more relevant parties may be in communication with the online platform 100.

A user 112, such as the one or more relevant parties, may access online platform 100 through a web-based software application or browser. The web-based software application may be embodied as, for example, but not be limited to, a website, a web application, a desktop application, and a mobile application compatible with a computing device 900.

According to some embodiments, the online platform 100 may communicate with a system 200 for performing automatic maintenance of an autonomous vehicle.

Figure 2:
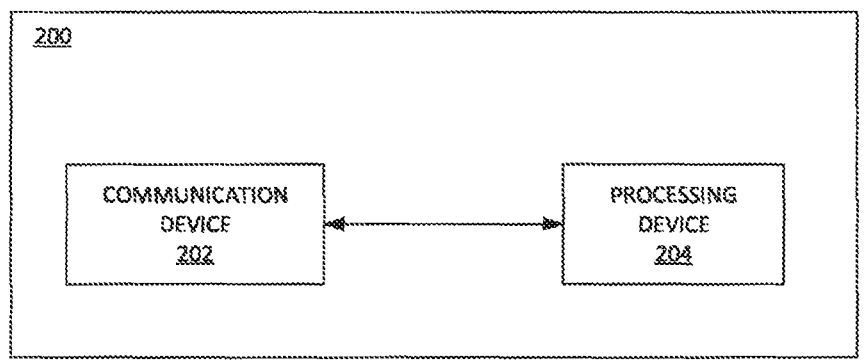
FIG. 2 is a block diagram of a system for performing automatic maintenance of an autonomous vehicle, in accordance with some embodiments.

FIG. 2 is a block diagram of a system 200 for performing automatic maintenance of an autonomous vehicle (such as the autonomous car 116), in accordance with some embodiments. The system 200 may include a communication device 202 configured for receiving a maintenance request from the autonomous vehicle. The maintenance request includes diagnostic data from an On-Board Computing (OBC) device of the autonomous vehicle. For example, the diagnostic data may include data received from one or more sensors selected from a group comprising a Mass Air Flow Sensor, an Engine Speed Sensor, an Oxygen Sensor, a Manifold Absolute Pressure Sensor, a Spark Knock Sensor, a Fuel Temperature Sensor, a Voltage Sensor, a GPS sensor, a Crank Position sensor, a Cam Position sensor, Engine Coolant temperature sensor, Manifold Absolute Pressure sensor, a throttle position sensor (TPS), an Accelerator pedal position sensor (APPS), a Heated Oxygen sensor in exhaust, a Wheel Speed Sensor, a Tire Pressure sensor (TPMS), an Intake/Ambient Air Temp (IAT), Oxygen/Lambda Sensor, Fuel Pressure Sensor, Vehicle Speed Sensor (VSS). The diagnostic data may be stored in the databases 114.

Further, the communication device 202 may be configured for receiving a work schedule of a closest facility.

Moreover, the communication device 202 may be configured for sending an appointment reservation to the autonomous vehicle, wherein the appointment reservation includes a time slot and the location of the closest facility.

Further, the system 200 may include a processing device 204 configured for analyzing the diagnostic data to identify at least one recommended car service for the autonomous vehicle. For example, the at least one recommended car service may include one or more of a regular service, a premium service, a safety service, an interim service, a full service, a car wash service, a car interior care service, a car exterior care service, a mechanical service, wheel alignments and balancing service, brake and clutch service, and tire service.

The processing device 204 may be configured to compare a vehicle location against a plurality of facility locations to identify the closest facility from a plurality of maintenance facilities. The plurality of facility locations may be related to the locations of the plurality of maintenance facilities.

Further, the processing device 204 may be configured to generate the appointment reservation with the closest facility in the one or more facility locations based on the received one or more work schedules. In further embodiments, the processing device may be configured to navigate the autonomous vehicle to the closest facility. The closest facility provides the recommended car service for the autonomous vehicle In further embodiments, the processing device 204 may be configured to identify the at least one recommended car service for the autonomous vehicle based on one or more of weather conditions, historical data, maintenance schedules, maintenance contracts and client requirements. Further, information including one or more of weather conditions, historical data, maintenance schedules, maintenance contracts and client requirements may be stored in the databases 114.

In some embodiments, each of the plurality of maintenance facilities may include one or more maintenance stations, wherein each of the one or more maintenance stations may be associated with at least one car service from a plurality of car services. Further, maintenance criteria may be associated with each maintenance station in the one or more maintenance stations.

Further, the one or more maintenance stations may include an evaluation station, wherein the evaluation station includes a plurality of inspection sensors.

In some embodiments, the communication device 202 may be further configured to receive diagnostic data through the plurality of inspection sensors. The processing device 204 may be configured to analyze one or more of the diagnostic data, a performance data, a navigation data, and a maintenance history profile to determine at least one recommended service. Further, the processing device 204 may be configured to navigate the autonomous vehicle to a maintenance station corresponding to the at least one recommended service. The maintenance history profile may include one or more of warranty contracts, service contracts, client requirements, and service history.

In further embodiments, the processing device 204 may be further configured to search the diagnostic data from an On-Board Computing (OBC) device for at least one trouble code from a plurality of trouble codes. Further, the processing device 204 may be configured to navigate the autonomous vehicle to the maintenance station based on the at least one trouble code.

Figure 3:
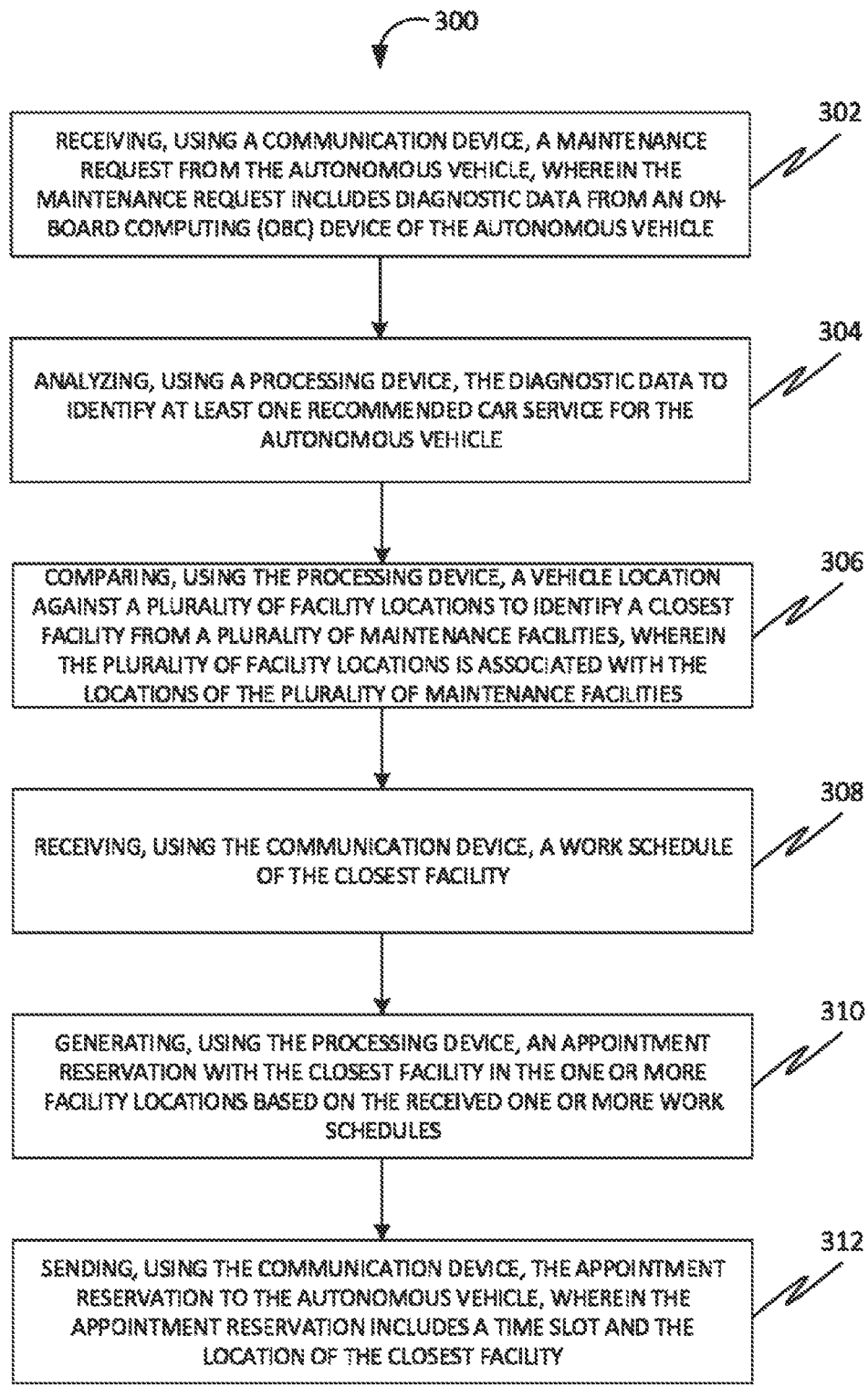
FIG. 3 is a flowchart of a method for performing automatic maintenance of an autonomous vehicle, in accordance with some embodiments.

FIG. 3 is a flowchart of a method 300 for performing automatic maintenance of an autonomous vehicle (such as the autonomous car 116), in accordance with some embodiments. At 302, the method 300 includes receiving, using a communication device (such as the communication device 202), a maintenance request from the autonomous vehicle, wherein the maintenance request includes diagnostic data from an On-Board Computing (OBC) device of the autonomous vehicle. For example, the diagnostic data may include data received from one or more sensors selected from a group comprising a Mass Air Flow Sensor, an Engine Speed Sensor, an Oxygen Sensor, a Manifold Absolute Pressure Sensor, a Spark Knock Sensor, a Fuel Temperature Sensor, a Voltage Sensor, a GPS sensor, a Crank Position sensor, a Cam Position sensor, Engine Coolant temperature sensor, Manifold Absolute Pressure sensor, a throttle position sensor (TPS), an Accelerator pedal position sensor (APPS), Oxygen sensor in exhaust, a Wheel Speed Sensor, a Tire Pressure sensor (TPMS), an Intake/Ambient Air Temp (IAT), Oxygen/O2/Lambda Sensor, Fuel Pressure Sensor, and Vehicle Speed Sensor (VSS).

At 304, the method 300 includes analyzing, using a processing device (such as the processing device 204), the diagnostic data to identify at least one recommended car service for the autonomous vehicle. For example, the at least one recommended car service may include one or more of a regular service, a premium service, a safety service, an interim service, a full service, a car wash service, a car interior care service, a car exterior care service, a mechanical service, wheel alignments and balancing service, brake and clutch service, and tire service.

In further embodiments, the analyzing may include identifying, using a processing device, the at least one recommended car service for the autonomous vehicle based on one or more of weather conditions, historical data, maintenance schedules, maintenance contracts and client requirements.

At 306, the method 300 includes comparing, using the processing device, a vehicle location against a plurality of facility locations to identify a closest facility from a plurality of maintenance facilities, wherein the plurality of facility locations may be associated with the locations of the plurality of maintenance facilities.

At 308, the method 300 includes receiving, using the communication device, a work schedule of the closest facility.

At 310, the method 300 includes generating, using the processing device, an appointment reservation with the closest facility in the one or more facility locations based on the received one or more work schedules. The closest facility provides the recommended car service for the autonomous vehicle At 312, the method 300 includes sending, using the communication device, the appointment reservation to the autonomous vehicle, wherein the appointment reservation includes a time slot and the location of the closest facility.

In further embodiments, the method 300 may include navigating, using a processing device, the autonomous vehicle to the closest facility.

Figure 4:
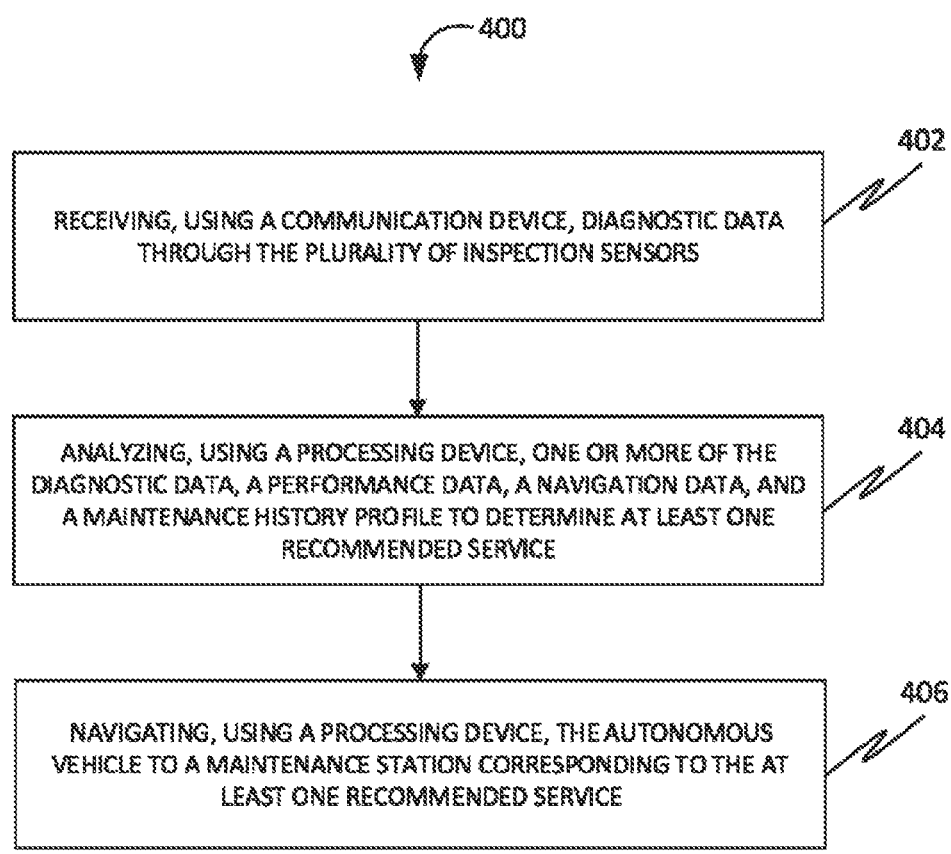
FIG. 4 is a flowchart of a method for navigating the autonomous vehicle to a maintenance station in one or more maintenance stations, in accordance with some embodiments.

FIG. 4 is a flowchart of a method 400 for navigating the autonomous vehicle (such as the autonomous car 116) to a maintenance station in one or more maintenance stations, in accordance with some embodiments. Each of the plurality of maintenance facilities may include the one or more maintenance stations. Each of the one or more maintenance stations may be associated with at least one car service from a plurality of car services. For example, the one or more maintenance stations may include an evaluation station, wherein the evaluation station includes a plurality of inspection sensors.

At 402, the method 400 may include receiving, using the communication device, diagnostic data through the plurality of inspection sensors.

At 404, the method 400 may include analyzing, using a processing device, one or more of the diagnostic data, a performance data, a navigation data, and a maintenance history profile to determine at least one recommended service.

At 406, the method 400 may include navigating, using a processing device, the autonomous vehicle to a maintenance station corresponding to the at least one recommended service.

Figure 5:
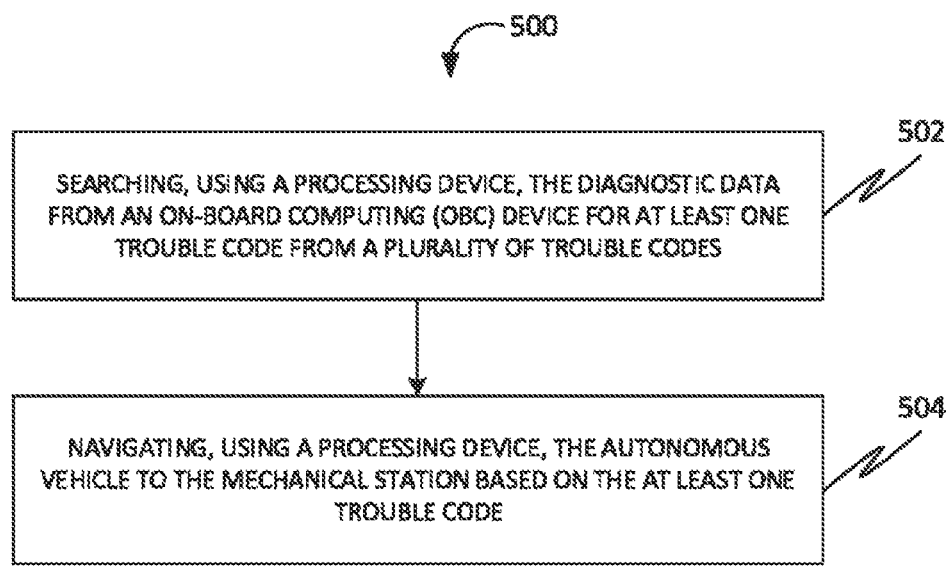
FIG. 5 is a flowchart of a method for navigating the autonomous vehicle to a maintenance station in one or more maintenance stations, in accordance with some embodiments.

FIG. 5 is a flowchart of a method 500 for navigating the autonomous vehicle (such as the autonomous car 116) to a maintenance station in one or more maintenance stations, in accordance with some embodiments. At 502, the method 500 may include searching, using a processing device, the diagnostic data from an On-Board Computing (OBC) device for at least one trouble code from a plurality of trouble codes. Further, at 504, the method 500 may include navigating, using a processing device, the autonomous vehicle to the mechanical station based on the at least one trouble code.

Figure 6:
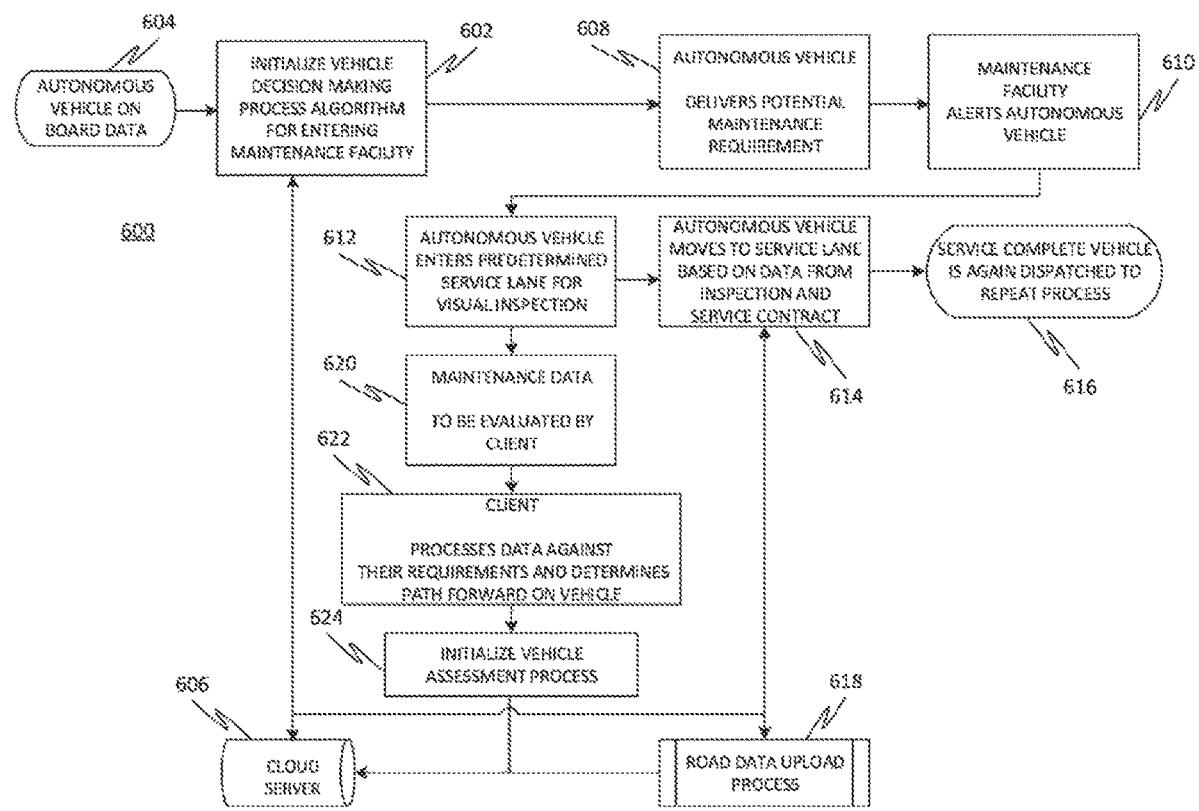
FIG. 6 is a flowchart of a method for performing automatic maintenance of an autonomous vehicle, in accordance with some embodiments.

FIG. 6 is a flowchart of a method 600 for performing automatic maintenance of an autonomous vehicle (such as the autonomous car 116), in accordance with some embodiments. One or more steps of the method 600 may be performed by the system 200 in conjunction with the autonomous vehicle and the client either by an automated process or by an individual through a web-based dashboard.

Figure 8:
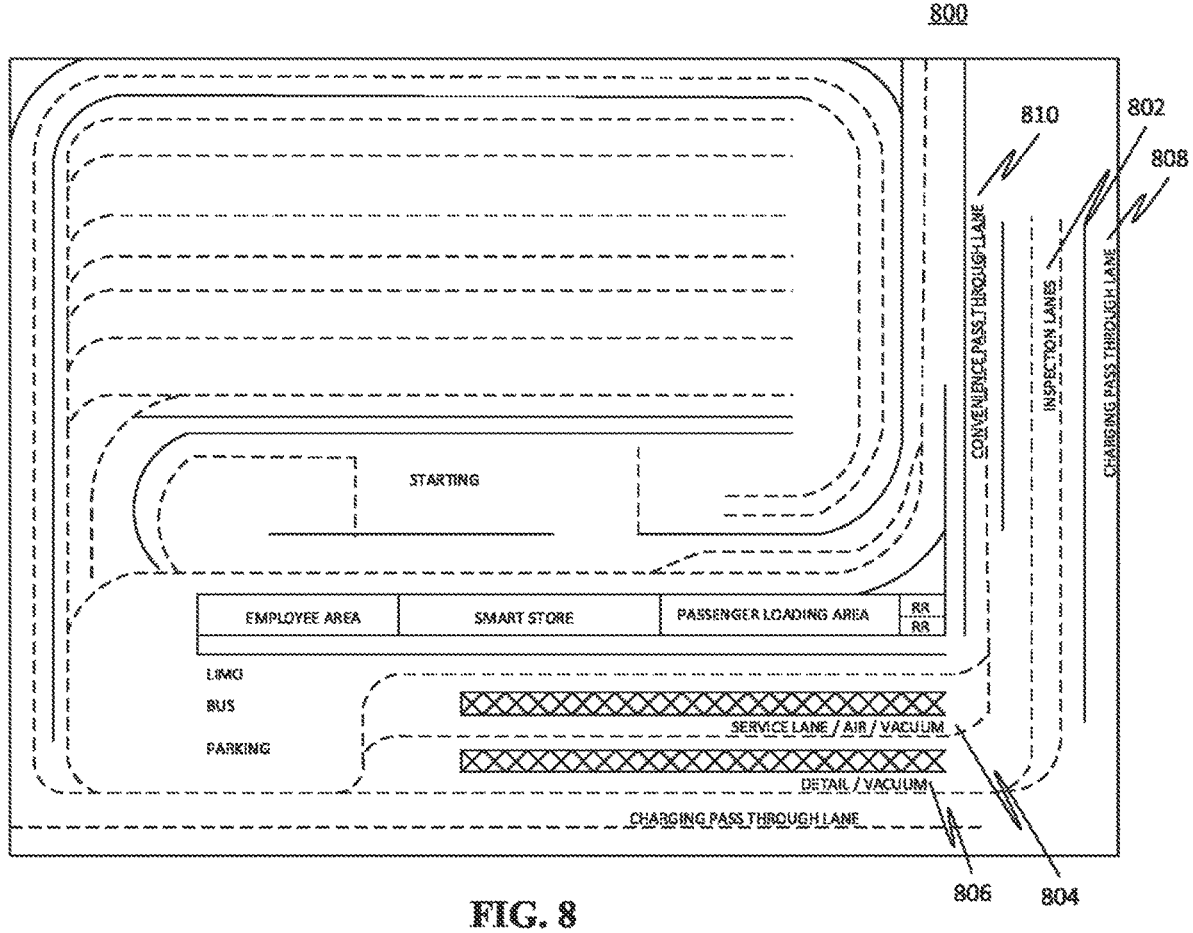
FIG. 8 is a schematic of a maintenance facility, in accordance with an exemplary embodiment.

At 602, a vehicle decision making process algorithm for entering a maintenance facility (such as a maintenance facility 800 shown in FIG. 8) may be initiated. The vehicle decision making process algorithm may obtain Autonomous Vehicle On Board Data 604 to determine one or more parameters such as battery life of the autonomous vehicle. Further, the vehicle decision making process algorithm may obtain data related to previous inspections from a cloud server 606 (similar to the centralized server 102). Further, the vehicle decision making process algorithm may determine potential maintenance requirements based on data collection from previously documented routes. For example, certain routes will produce higher levels of debris. Further, certain routes will produce higher levels of wear and tear on vehicle.

At 608, the vehicle decision making process algorithm may determine and deliver potential maintenance requirement. For example, the maintenance requirement may include one or more of a regular service, a premium service, a safety service, an interim service, a full service, a car wash service, a car interior care service, a car exterior care service, a mechanical service, wheel alignments and balancing service, brake and clutch service, and tire service.

Thereafter, at 610, the method 600 may include alerting the autonomous vehicle to appropriate service location and inspection lane (such as inspection lane 802 shown in FIG. 8) for vehicle entry based on predetermined maintenance requirements (or service level requirement). At 612, the autonomous vehicle may enter the predetermined service lane for visual inspection (such as the inspection lane 802. The results of the visual inspection may be inputted into an algorithm based on one or more of a service contract level, maintenance costs to date and value of the vehicle.

At 614, the autonomous vehicle may move to the service lane based on data from inspection and service contract. For example, the service lane may be one of an air/vacuum service lane 804, a detail/vacuum service lane 806, a charging pass through lane 808 and a convenience pass through lane 810. Thereafter, at 616, the service complete vehicle may be dispatched to repeat the process. Further, the data from inspection may be sent to a road data upload process 618. Moreover, the data from inspection may be stored in the cloud server 606 (such as in the databases 114).

Further, at 620, maintenance data is collected for evaluation by the client. The maintenance data may include one or more of maintenance costs, value, potential mechanical or maintenance costs. The maintenance data may be stored in the cloud server 606 (such as in the databases 114).

Thereafter, at 622, the client may process maintenance data against their requirements and determines path forward on vehicle. Further, at 624, the client may adjust service contract and move vehicle from higher tier to lower tier. Moreover, the client may determine to replace or remove vehicle from a fleet.

Figure 7:
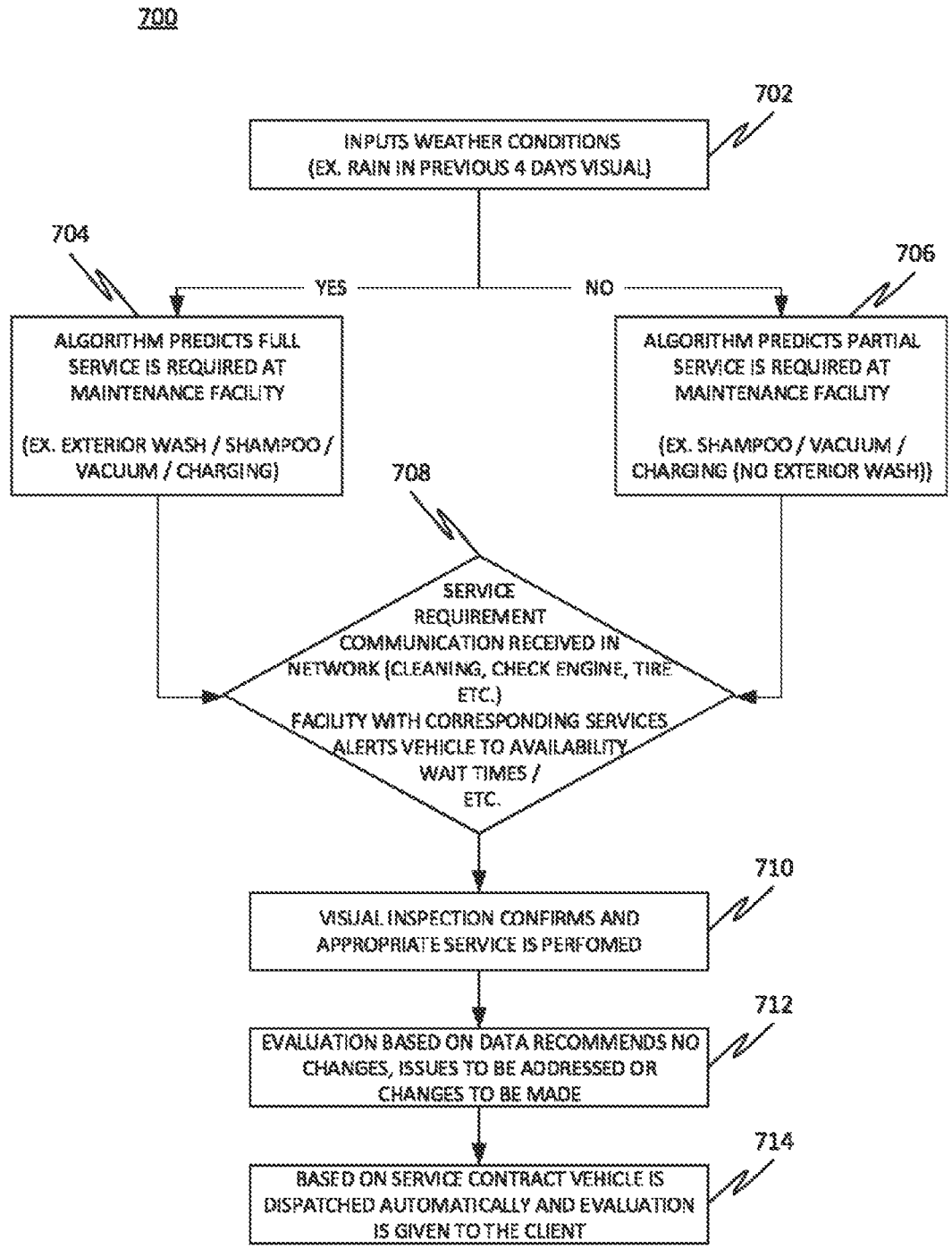
FIG. 7 is a flowchart of a method for performing automatic maintenance of an autonomous vehicle based on external data, in accordance with an exemplary embodiment.

FIG. 7 is a flowchart of a method 700 for performing automatic maintenance of an autonomous vehicle (such as the autonomous car 116) based on external data, in accordance with an exemplary embodiment. The autonomous vehicle is part of a fleet for a ride-hailing service. In an exemplary scenario, the autonomous vehicle may be operating in a northern area of the city, which is a business district. Therefore, the autonomous vehicle may be mainly serving as taxi service for lunch and business-to-business commuting.

At 702, external data may be obtained such as weather data. For example, the weather data may indicate rain in the previous four days. This may lead to checking if the autonomous vehicle needs servicing due to driving in rain for the past four days.

At 704, an algorithm may determine that full service is required at a maintenance facility. For example, the full service may include an exterior wash, shampoo, vacuum, and charging.

Alternative, at 706, the algorithm may determine that a partial service is required at the maintenance facility. For example, the partial service may include shampoo, vacuum and charging but the exterior wash is not required.

Based on the determination by the system, a service requirement may be communicated to a network (such as the centralized server 102) at 708. For example, the service requirement may include one or more of cleaning, check engine, and tire etc. A maintenance facility with corresponding services may send alert to the autonomous vehicle about the available wait times etc.

Then, at 710, visual inspection may be performed to confirm the service requirement. Thereafter, the appropriate service may be performed.

Further, at 712, an evaluation based on data may be performed which may recommend one or more of no changes required, issues to be addressed and changes to be made. Finally, at 714, based on service contract the autonomous vehicle may be dispatched automatically and the evaluation may be given to the client.

Figure 9:
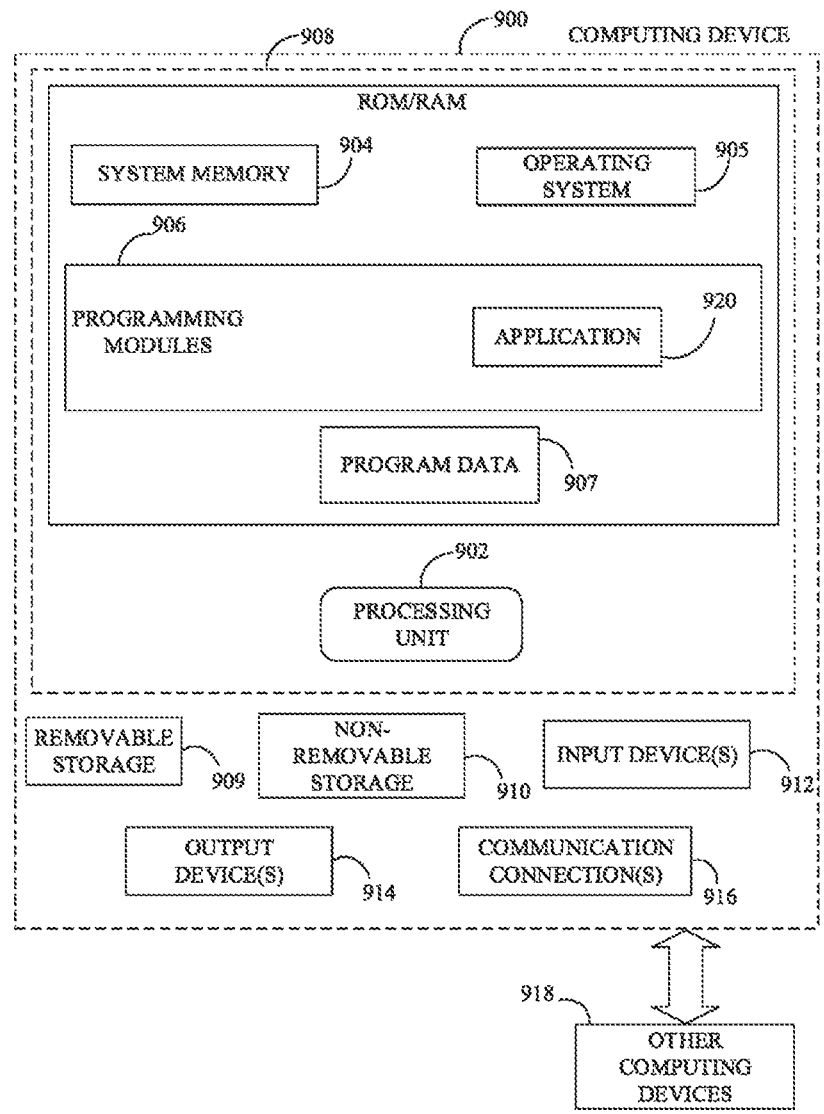
FIG. 9 is a block diagram of a computing device for implementing the methods disclosed herein, in accordance with some embodiments.

FIG. 9 is a block diagram of a computing device for implementing the methods disclosed herein, in accordance with some embodiments. Consistent with an embodiment of the disclosure, the aforementioned storage device and processing device may be implemented in a computing device, such as computing device 900 of FIG. 9. Any suitable combination of hardware, software, or firmware may be used to implement the memory storage and processing unit. For example, the storage device and the processing device may be implemented with computing device 900 or any of other computing devices 918, in combination with computing device 900. The aforementioned system, device, and processors are examples and other systems, devices, and processors may comprise the aforementioned storage device and processing device, consistent with embodiments of the disclosure.

With reference to FIG. 9, a system consistent with an embodiment of the disclosure may include a computing device or cloud service, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include a program data 907. Operating system 905, for example, may be suitable for controlling computing device 900's operation. Furthermore, embodiments of the disclosure may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable, and non-removable media implemented in any method or technology for storage of information, such as computer-readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, etc. Output device(s) 914 such as a display, speakers, a printer, etc. may also be included. The aforementioned devices are examples and others may be used.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The term computer readable media as used herein may include both storage media and communication media.

As stated above, a number of program modules and data files may be stored in system memory 904, including operating system 905. While executing on processing unit 902, programming modules 906 (e.g., application 920) may perform processes including, for example, one or more stages of methods 300-500, algorithms, systems, applications, servers, databases as described above. The aforementioned process is an example, and processing unit 902 may perform other processes. Other programming modules that may be used in accordance with embodiments of the present disclosure may include sound encoding/decoding applications, machine learning application, acoustic classifiers etc.

Figure 10:
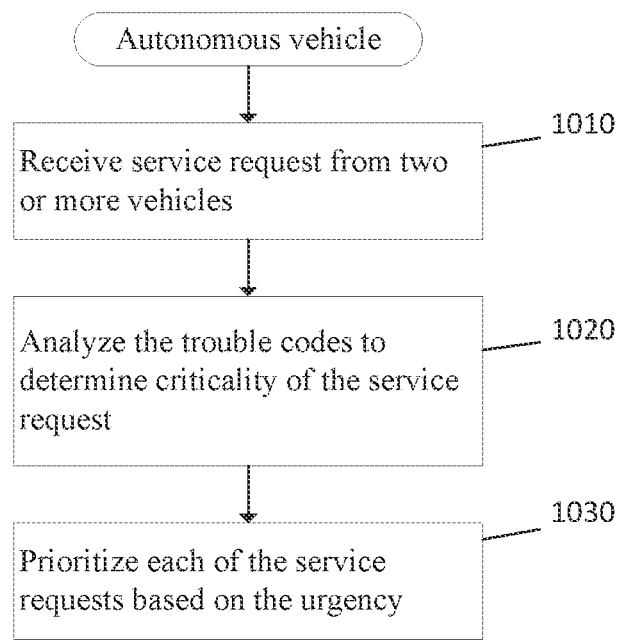
FIG. 10 is a flow chart showing a method for providing prioritizing service requests, in accordance with some embodiments.

In one aspect, the system disclosed herein can receive service request from multiple autonomous vehicles. The service request is accompanied by at least one trouble code. Referring to FIG. 10, disclosed is a method for prioritizing the autonomous vehicle routing based on the severity of the problems in the vehicle. Typically, the method allows scheduling available resources of a maintenance facility based on an urgency/criticality of the vehicle. The system, disclosed herein, can receive service request from two or more vehicles, at step 1010. The system can then analyze the trouble codes to determine criticality/urgency of the service request, at step 1020. Based on the analysis of the trouble codes, the system can then prioritize each of the service requests depending on urgency and other predetermined criteria, at step 1030. For example, the system can receive service request from three vehicles, wherein first service request from the first vehicle can be related to oil change. The second request relates to muffler replacement, and the third request relates to break replacement. The system can compare the first request with the second request and rank each request. In one case, the system can rank the first request i.e. oil change as of higher priority than the second request. Thereafter, the system can compare the first request, which is of higher priority, with the third request. On comparison, the system based on predetermined criteria assumes the third request of higher priority than the first request i.e. brake replacement is having urgency when compared to the oil change. The system, therefore, ranked the request in ascending order being second ranked lowest, followed by the first request, and the third request having highest rank. Based on the rank, the system can prioritize the third service request.

In one aspect, the system can prioritize different recommended services for a same vehicle. For example, the vehicle is recommended three main services i.e. oil change, muffler replacement, and brake replacement. While preparing the job sheet of the vehicle, the system can rank the three services. For example, first the brakes are replaced, then oil change, and last the muffler is replaced.

Figure 11:
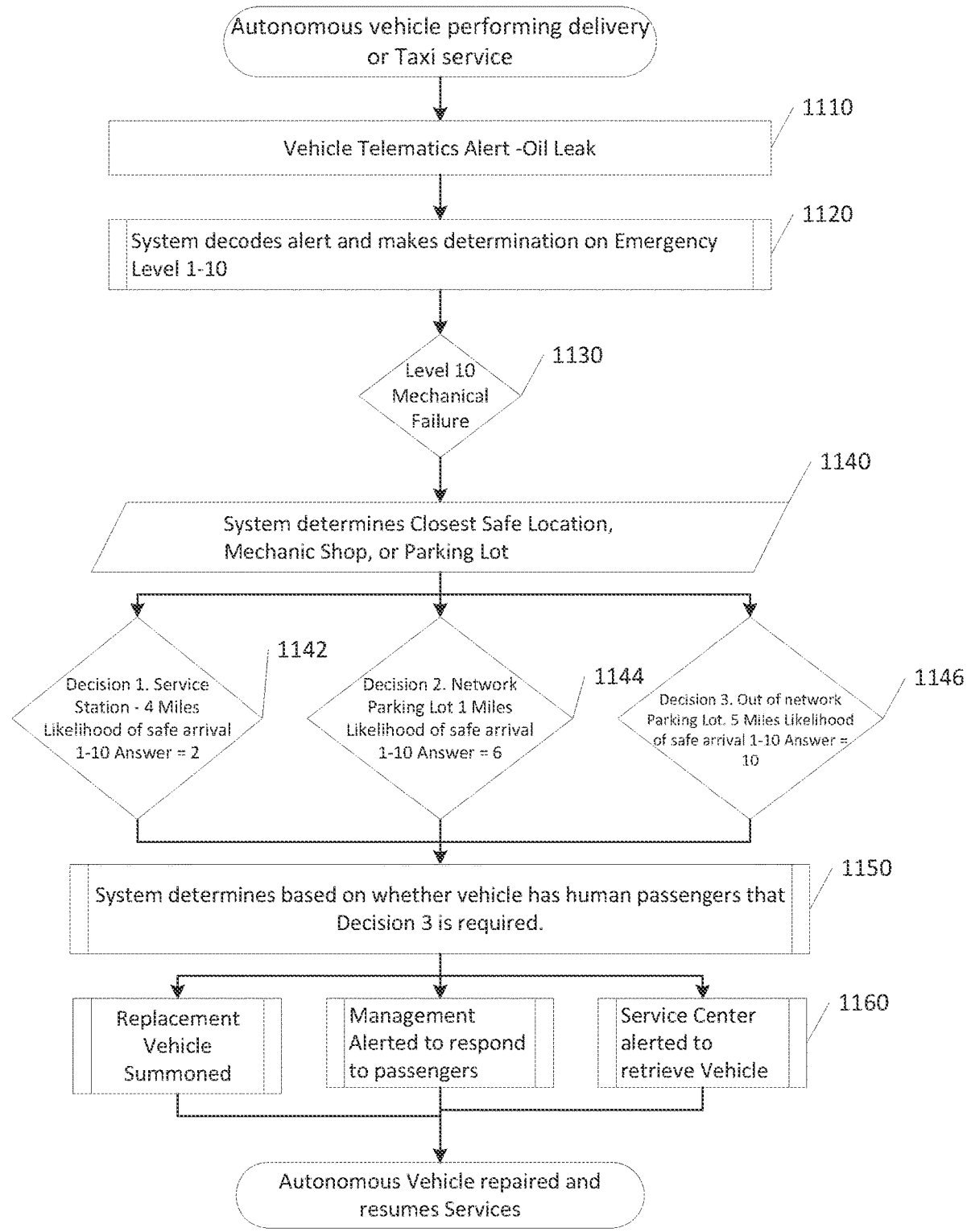
FIG. 11 shows an exemplary embodiment of the method for scheduling service of an autonomous vehicle based on severity of the service request.

In one embodiment, the system and method disclosed herein can, for an autonomous vehicle performing delivery or providing taxi services, be serviced. The system, disclosed herein, can receive a service request from an autonomous vehicle having a severe malfunction, at step 1110. For example, the system can receive a trouble code from an autonomous vehicle indicating an oil leak. Based on a predetermined algorithm, the system can rank the service request on a scale, for example between 1 to 10, at step 1120. In one case, the system ranks the service request "10" as mechanical failure, at step 1130. The scale can be of any range having a lowest value and a highest value, wherein values are increment from low value to the highest value. The lowest value may indicate the service request is having least criticality, while the highest value may indicate the service request is comparatively of higher criticality. Upon determining the level of the service request on the scale, the system can determine closest maintenance facility or a parking lot, at step 1140. Based on the predetermined algorithm, the system can determine multiple logics. For example, FIG. 11 shows three logics 1142, 1144, and 1146. The first logic determines that a closest maintenance facility is 4 miles from the current location of the autonomous vehicle. The algorithm can rank the logic for likelihood of safe arrival. The first logic is ranked 2. The second logic determines a network parking lot is within 1 mile and the likelihood of safe arrival is ranked 6. The third logic determines out of network parking lot 5 miles from the current location and the likelihood of safe arrival is 10. The vehicle can determine based on the vehicle having passengers that logic 3 is appropriate, at step 1150. The algorithm can then summon the replacement vehicle, alerts the management to respond to the passengers, and the maintenance facility can be instructed to retrieve the vehicle, at step 1160.

Figure 12:
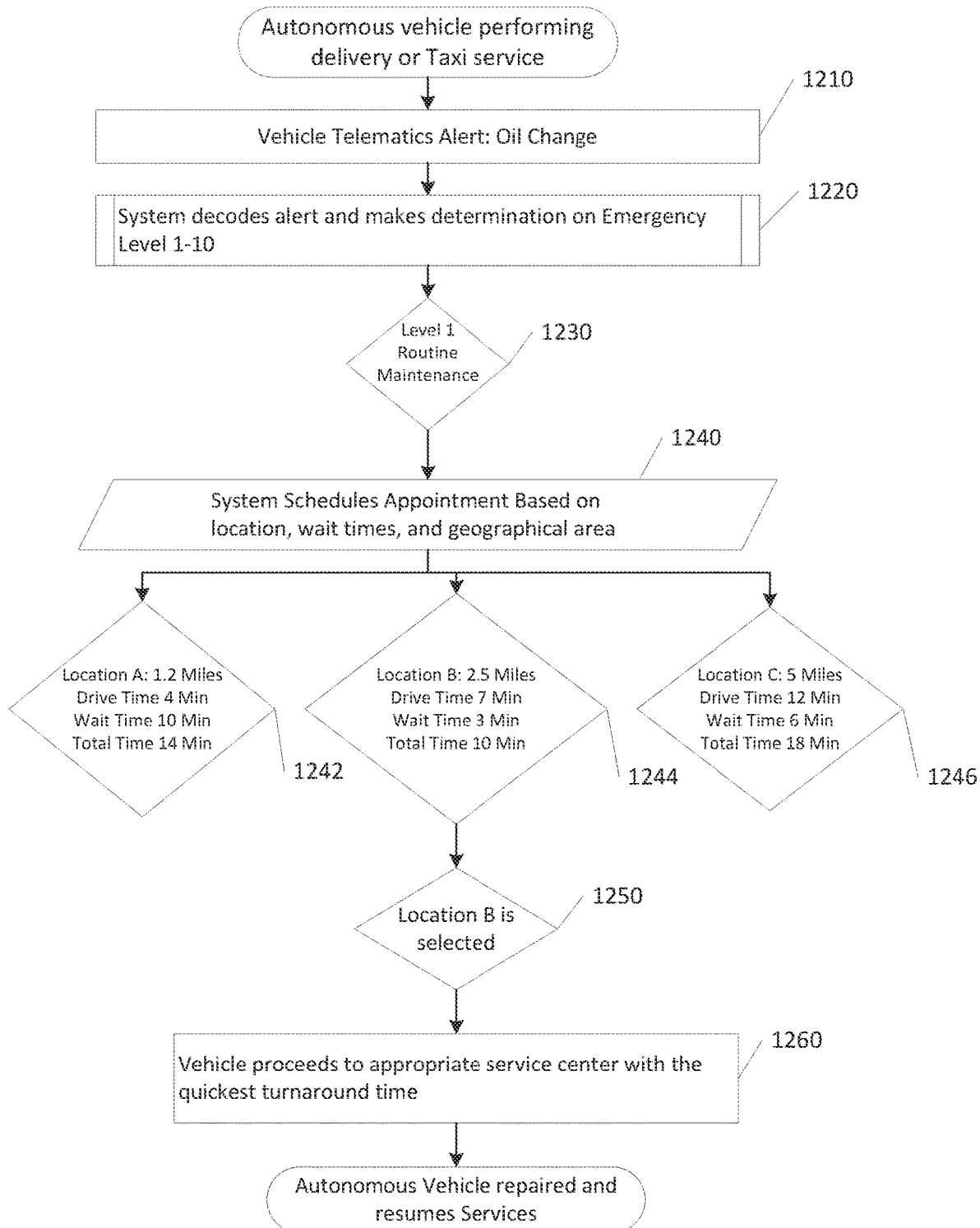
FIG. 12 is a flowchart showing a method of scheduling the service of an autonomous vehicle based on location and timings.

Referring to FIG. 12 wherein the system receives a service request for oil change, at step 1210. The predetermined algorithm decodes the service request and an urgency level of the service request on a scale of 1 to 10, at step 1220. In FIG. 12, the algorithm determines the emergency level as 1 i.e. routine maintenance, at step 1230. Thereafter, the algorithm can schedule an appointment based on location, wait times, and geographical area, at step 1240. For example, the system can evaluate three maintenance facilities location A, Location B, and Location C. At location A, the total time including the time to reach the maintenance facility and wait time was determined to be 14 minutes, at step 1242. At location B, the total time will be 10 min, at step 1244. At location C, the total time will be 18 minutes, at step 1246. Location B despite being 1.3 miles farther from location A has a total time of 4 minutes less than the location A. This is due to less wait time at location B. The system can set the location B for appointment, at step 1250. The Vehicle proceeds to appropriate service center with the quickest turnaround time, at step 1260.

Figure 13:
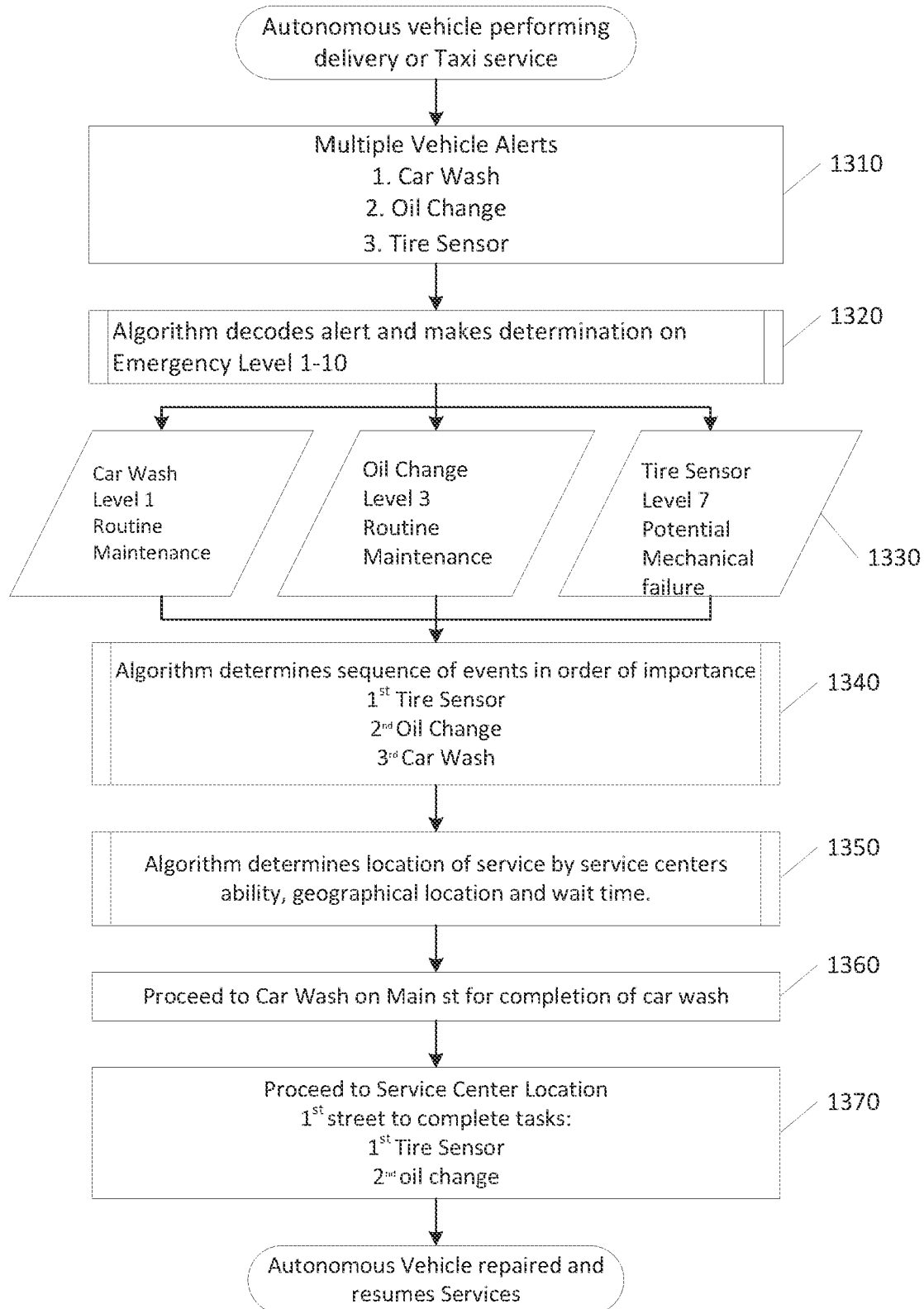
FIG. 13 is a flow chart showing a method for prioritizing service requests from multiple vehicles.

Referring to FIG. 13 which shows the automatic routing of an autonomous vehicle performing delivery or taxi services. The system, disclosed herein, can receive service request from multiple vehicles, at step 1310. FIG. 13 shows the service requests received from three vehicles. The first service request relates to a car wash. The second service requests relates to oil change. The third service requests is for the tire sensor. The system decodes the service requests and determines the urgency of each service requests, at step 1320. Each service request can be accessed on a scale of 1-10. The system determine the first service request of Level 1 i.e. routine maintenance. The second service requests is shown to be accessed as Level 3 which is routine maintenance. The third service request is accessed as Level 7 which is mechanical failure. The system ranks the service requests based on the urgency levels. Third service request is marked having highest priority, followed by second service request, and the first service request having the lowest priority. The system can then determine the location of services by service centers ability, geographical location, and the wait time. The vehicle with car wash request can be send to the car wash station, while the third vehicle is serviced first for tire sensor, followed by the second vehicle having it oil changed.

In one embodiment disclosed is a system and method for routing autonomous vehicle based on the severity or urgency of the service request. For example, vehicle with mechanical failure can be prioritized compared to those with routine maintenance. With regard to the proper direction for self-driving cars in an automated service environment, the system is designed to distribute the vehicles to maintenance facilities based on the severity of the maintenance required and the in the order of imminent failure to maintenance. A vehicle in the service network is in communication with the system and when trouble codes are produced by a vehicle, the codes can be received by the system and upon receiving the codes, the system can then determine the criticality or urgency. Now based on the criticality of the code and the potential for harm or inconvenience to its passengers, the vehicle can be directed to the appropriate repair facility or parking area. The system can determine from the codes produced whether or not the vehicle can continue through to its original destination or if it must report immediately to a service facility. If the vehicle is determined to be in imminent failure, the system could also direct the vehicle to a parking area to await a replacement and towing services. Proper navigation is critical for fully automated vehicles without drivers in emergency situations for the safety of its passengers. For example, if the automated vehicle produces a trouble code signaling low tire pressure, the system can communicate to the vehicle that it needs to go to facility. The decision of the system is based on the fact that the service station that can repair the malfunction is located nearby. It serves no purpose to send a vehicle needing tire repair to a facility that only does oil changes. If it the tire pressure is decreasing at a rate that it cannot reach such a facility then the system can find the nearest parking area, such a store, fast food, and like to wait for help.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In certain embodiments, the disclosed system and method can make blockchain smart contracts from the inspection data, to further automate the maintenance of autonomous vehicles. The disclosed system and method aim to fully automate the maintenance of autonomous vehicles. The disclosed system and method can make the process of maintaining autonomous vehicles more efficient by reducing human intervention. After receiving the detailed inspection report using the methods as described above, the system can determine one or more service requirements for an autonomous vehicle. The disclosed system based on predefined preferences or contracts with the owner of the autonomous vehicle, can automatically choose the maintenance services for the vehicle. Alternatively, modifications, preferences, and the like in the maintenance services can be received from the owner. It is understood that the owner includes any person authorized to approve the services for the autonomous vehicle. The disclosed system upon confirming the required maintenance services for the autonomous vehicle can enter a smart contract with the owner of the autonomous vehicle for servicing the autonomous vehicle. It is understood that the dislcosed system can autonomously process the smart contracts and store the smart contract in a blockchain. The smart contract can be stored in a blockchain database to ensure authenticity and later verification or audit. Once, the smart contract has been entered by the system with the owner, the autonomous vehicle can be moved to the servicing stations based on a predetermined schedule. Any changes in the predetermined schedule can optionally be communicated to the owner by the system. Any further servicing requirements received by the system during the maintenance and for such servicing requirements, approval of the owner may be needed, the system can enter a new smart contract for the further servicing requirements with the owner and the same can be stored in the blockchain.

Upon completion of the maintenance or servicing of the autonomous vehicle, the owner can optionally be informed. Based on the terms of the smart contract, the system can deduct the servicing fee from an account of the owner, provided by the owner with consent to deduct the servicing fee. Alternatively, a payment interface can be presented on an owner's device for payment. The amount of payment can be predefined and mentioned in the smart contract. Alternatively, the amount of payment may not be predefined in the smart contract. The payment can be acknowledged, and an entry of the payment can also be made in the blockchain, thus completing the smart contract. Alternatively, in certain embodiments, receiving of the autonomous vehicle by the owner may complete the smart contract and the same can be recorded in the blockchain.

An autonomous vehicle depending on the utility may have different maintenance requirements. For example, passenger vehicles may require more frequent maintenance than the private vehicles. Commercial autonomous vehicles may require more frequent and detailed inspection, cleaning, and maintenance services than do personally owned autonomous vehicles. In general, the commercial autonomous vehicles are shared and the absence of a human driver to monitor for cleanliness, debris, and other potentially hazardous items in the autonomous mandates the need for frequent inspections. Thus, it is desired that the commercial autonomous vehicles be inspected daily or in most use cases more than once daily. The disclosed system by automating the inspection, maintenance, and smart contracts can make the process of inspection and maintenance both cost-effective and time efficient. The disclosed system and method can help prevent any downtime experienced by long lines of autonomous vehicles waiting for simple inspections, i.e., minimizing the human intervention to insignificant levels. Thus, the transactions can be handled in an expedient way that may be critical to the proper functioning of the industry itself.

In a certain embodiment, the disclosed system and method can implement smart contracts for the transactions between the inspections units and maintenance units of one or more service providers, the fleet operators, and the owners of the autonomous vehicles. Such smart contract can be autonomous, at least the system can process the smart contracts autonomously. The inspections units and maintenance units for servicing an autonomous vehicle can be in the same facility or a different facility. The disclosed method can include the steps of collection of all of the data points from inspection and through each repair or maintenance event, the conversion of this data into a database that can be delivered via software to the vehicle owner and fully process a smart contract to expedite the maintenance, prevent downtime and increase utilization of the autonomous vehicle. For example, during inspection, a requirement for washing the autonomous vehicle is identified by the system, the system can enter a smart contract with the owner to receive consent for washing the autonomous vehicle. The smart contract can include the details of the required services and items, the cost for the services and items, the items used in the service. A report can be generated by the system from the inspection data justifying the service request, and the report can form a part of the smart contract. For example, the dirty vehicle can be detected by a camera or any kind of scanner, and the photograph or scanned data can be used to generate the report. Similar reports can be created from the servicing station upon completion of the service, and these reports can be appended to the smart contract and stored in the blockchain. For example, after washing the autonomous vehicle, the autonomous vehicle can be scanned by the camera or the scanner, and new photographs or scanned data can be used to generate the report indicating completion of the service. Also, the disclosed system can enter smart contracts with one or more inspection units and servicing units. In one case, the disclosed system can enter a smart contract with an inspection unit for inspecting an autonomous vehicle. The system can receive the inspection data from the inspection unit which completes the smart contract. The inspection data can be used to determine one or more services the autonomous vehicle requires. The inspection data may be converted into a report that justifies the service requests and the same can be appended to the smart contract with the inspection unit and stored in the blockchain database. Based on the determined service requirements, the system can enter smart contracts with one or more servicing units to facilitate the servicing of the autonomous vehicles. The system can receive completion reports from one or more servicing units and the same can be appended to respective smart contracts for the completion of the contract. Based on the completion report and a smart contract with the next servicing station, the vehicle can be moved to the next servicing station. For example, the system can enter into a smart contract with the inspection unit and then enter into a smart contract with the car washing unit. The system may get an inspection report from the inspection unit which indicates the washing requirements for the autonomous vehicle. It is understood that for the different stages or phases of inspection and maintenance, the smart contract can be entered by the system with the inspection and servicing units. Smart contracts can also be entered by the system with the owner or approving party for providing their consent to the services and fees.

In certain embodiments, disclosed is an autonomous method for inspection and servicing (maintenance) of autonomous vehicles. First, an autonomous vehicle entering the maintenance environment can be identified by the system. A unique identifier for the autonomous vehicle can be obtained from multiple sources, such as but not limited to onboard computer systems, RFID Tags, external devices, and/or manual recording of the vehicle identification number. It is understood, however, that the unique identifier can be obtained before the autonomous vehicle enters the facility, through the network. As the autonomous vehicle moves through different units of the facility, the different units can generate the data. The units can be inspection units, service units, or any other unit for servicing the vehicle. The data can be generated manually, automatically, or by both as explained above and in the drawings. For example, automatic data can be generated by the sensors and machines from the autonomous vehicle. Manual data can be generated by the physical inspection and servicing of the autonomous vehicle. Once in the maintenance network, the maintenance contract requirements of the autonomous vehicle can be determined from the data received by the system. As the autonomous vehicle enters each phase of the inspection and maintenance (service), the inspection or servicing data generated at each phase (or unit) can be received and reviewed by the system. The system upon reviewing the data for a phase or stage can approve the inspection or service for the phase, and the autonomous vehicle can then move to the next phase. Upon completion of a phase or stage of inspection or maintenance, a smart sub-contract may be needed for the autonomous vehicle to be accepted by the next phase or stage in the inspection and maintenance of the vehicle. Thus, the full inspection and maintenance cycle of the autonomous vehicle can be recorded in the form of smart contracts and the same can be saved on a blockchain for later audit and verification.

Figure 14:
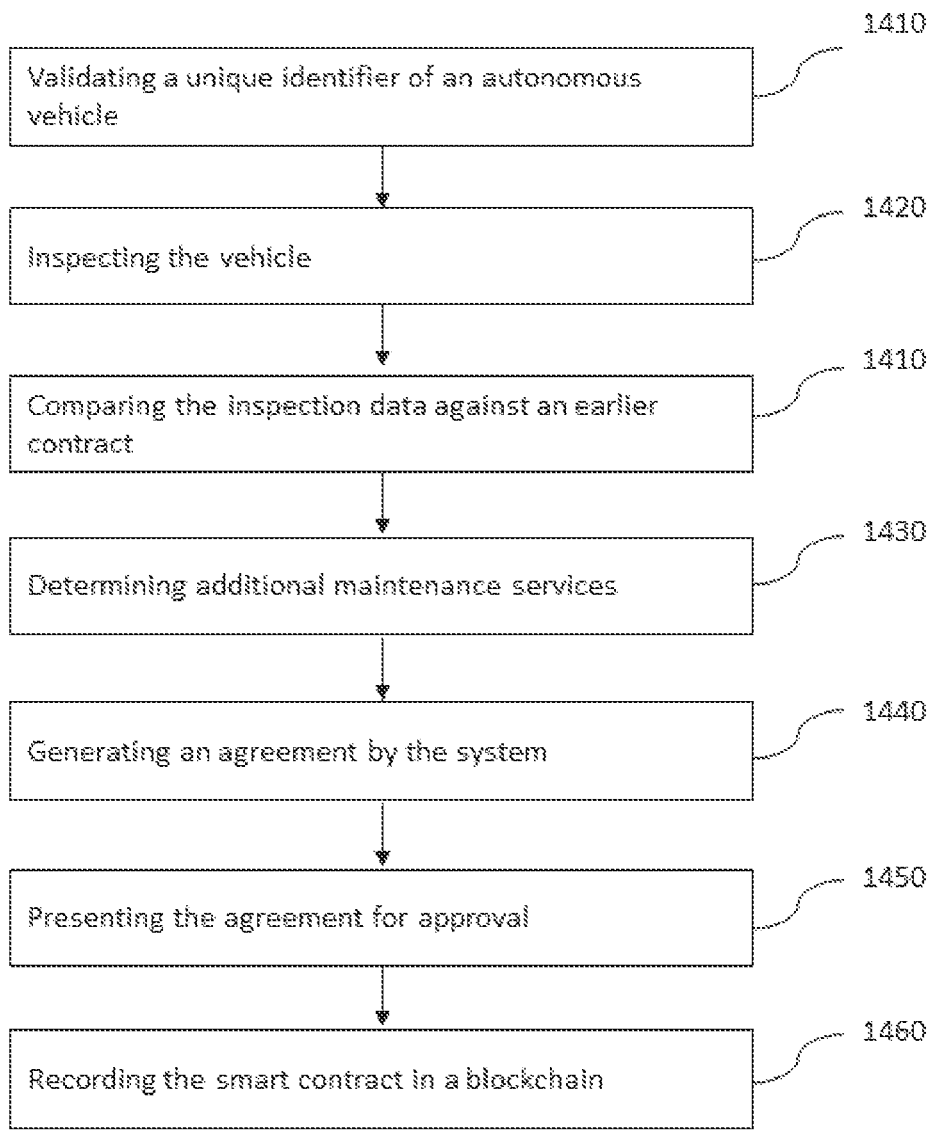
FIG. 14 is a flow chart showing a method for making smart contracts, according to an exemplary embodiment of the present invention.

The system is configured to store the maintenance contract comprised of the service intervals of each type of maintenance action. A contract database configured to store one or more blockchains, each implementing a smart contract of the maintenance process. Referring to FIG. 14, which is a flowchart showing method of the disclosed system. When the autonomous vehicle enters the maintenance environment, the unique identifier of the autonomous vehicle can be validated and the maintenance parameters of the vehicle can be accessed, at step 1410. The vehicle can then be inspected visually by visual detection devices (cameras) and/or visual inspection by a human inspector. The data generated from the inspection can be received by the system, at step 1420. The inspection data can then be compared against an earlier contract with the owner of the autonomous vehicle for servicing the autonomous vehicle, at step 1430. From the comparison or analysis by the system, additional maintenance requirements can be determined, at step 1440. From the available data, an agreement can be generated by the system, at step 1450. The agreement can then be presented to an approving party, which can be an owner, supervisor, or any person for review and approval, at step 1460. The interface presented to the approving party, through which the agreement can be presented, may allow the approving party to suggest any modification. Based on the suggestions by the approving party, a revised agreement can be generated by the system and again sent for approval by the approving party. Once, approved, a smart contract is made and entered into a blockchain, at step 1470. Should any new requirement for servicing the vehicle arise after the smart contract, a new smart contract can be made by the system, or the smart contract can be updated. The same process can take place for each step of the maintenance process from the carwash, oil changes, repairs, charging, or multitudes of service or repairs that require vendor payment and approval.

In certain embodiments, the smart contract can be structured with details of the maintenance requirements broken stagewise. The disclosed system can receive data from each maintenance phase, and the data can be mapped to the structured maintenance requirements in the smart contract. A report of the mapping of maintenance requirements in the smart contract with the data generated in each phase of maintenance can be recorded in a blockchain.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

What is claimed is:

1. A method for performing automatic maintenance of an autonomous vehicle, the method implemented within a system comprising a processor and a memory, the method comprising the steps of:

processing, by the system, a first smart contract with an inspection unit for inspecting an autonomous vehicle;

storing, by the system, the first smart contract in a blockchain;

receiving, by the system, inspection data from the inspection unit, the inspection data is for the autonomous vehicle;

determining, by the system, one or more maintenance services for the autonomous vehicle for servicing the autonomous vehicle based on the inspection data;

upon creating the first smart contract and completion of services at the inspection unit, processing, by the system, a second smart contract with a first servicing unit for servicing the autonomous vehicle based on the one or more maintenance services, wherein the autonomous vehicle is received at the first servicing unit upon creating the second smart contract; storing, by the system, the second smart contract in the blockchain; and upon creating the second smart contract and completion of services at the first service unit, processing, by the system, a third smart contract with a second servicing unit for servicing the autonomous vehicle based on the one or more maintenance services, wherein the autonomous vehicle is received at the second servicing unit upon creating the third smart contract and wherein at least one of the inspection unit, the first service unit, and the second service unit belong to a different facility.

2. The method according to claim 1, wherein the method further comprises the steps of:
receiving, by the inspection unit, the autonomous vehicle for inspection; and
inspecting, by the inspection unit, the autonomous vehicle for generating the inspection data.

3. The method according to claim 2, wherein the inspection unit comprises one or more sensors for automated inspection of the autonomous vehicle and generation of the inspection data.

4. The method according to claim 3, wherein the method further comprises the steps of:
receiving, by the inspection unit, a unique identifier of the autonomous vehicle; and
validating, by the inspection unit, the unique identifier based on the first smart contract.

5. The method according to claim 1 wherein the method further comprises the steps of:
receiving, by the system, navigation data from the autonomous vehicle, the navigation data comprises GPS locations of a path traveled by the autonomous vehicle and times the autonomous vehicle was at these GPS locations;
upon receiving the navigation data, determining, by the system, environmental conditions at the GPS locations during the associated times, the environmental conditions comprising road conditions at the GPS locations;
analyzing, by the system, the environmental conditions to obtain one or more adverse events the autonomous vehicle was subjected to; and
processing, by the system, the one or more adverse events to identify at least one maintenance service for the autonomous vehicle, wherein the second smart contract is processed for the at least one maintenance service.

6. The method according to claim 5, wherein the method further comprises the steps of:
receiving, by the system, a maintenance request from the autonomous vehicle, wherein the maintenance request comprises diagnostic data from an On-Board Computing (OBC) device of the autonomous vehicle;
retrieving, by the system, a past maintenance data of the autonomous vehicle; and analyzing, by the system, the diagnostic data, and the past maintenance data to identify at least one second maintenance service for the autonomous vehicle, wherein the second smart contract is processed for the at least one second maintenance service.

7. A system for performing autonomous maintenance of an autonomous vehicle, the system comprising a processor and a memory, the system configured to implement a method comprising the steps of:
processing, by the system, a first smart contract with an inspection unit for inspecting an autonomous vehicle;
storing, by the system, the first smart contract in a blockchain;
receiving, by the system, inspection data from the inspection unit, the inspection data is for the autonomous vehicle;
determining, by the system, one or more maintenance services for the autonomous vehicle for servicing the autonomous vehicle based on the inspection data;
upon creating the first smart contract and completion of services at the inspection unit, processing, by the system, a second smart contract with a first servicing unit for servicing the autonomous vehicle based on the one or more maintenance services, wherein the autonomous vehicle is received at the first servicing unit upon creating the second smart contract;
storing, by the system, the second smart contract in the blockchain; and
upon creating the second smart contract and completion of services at the first service unit, processing, by the system, a third smart contract with a second servicing unit for servicing the autonomous vehicle based on the one or more maintenance services, wherein the autonomous vehicle is received at the second servicing unit upon creating the third smart contract and wherein at least one of the inspection unit, the first service unit, and the second service unit belong to a different facility.

8. The system according to claim 7, wherein the method further comprises the steps of:
receiving, by the inspection unit, the autonomous vehicle for inspection; and
inspecting, by the inspection unit, the autonomous vehicle for generating the inspection data.

9. The system according to claim 8, wherein the inspection unit comprises one or more sensors for automated inspection of the autonomous vehicle and generation of the inspection data.

10. The system according to claim 9, wherein the method further comprises the steps of:
receiving, by the inspection unit, a unique identifier of the autonomous vehicle; and
validating, by the inspection unit, the unique identifier based on the first smart contract.

11. The system according to claim 7, wherein the method further comprises the steps of:
receiving, by the system, navigation data from the autonomous vehicle, the navigation data comprises GPS locations of a path traveled by the autonomous vehicle and times the autonomous vehicle was at these GPS locations;
upon receiving the navigation data, determining, by the system, environmental conditions at the GPS locations during the associated times, the environmental conditions comprising road conditions at the GPS locations;
analyzing, by the system, the environmental conditions to obtain one or more adverse events the autonomous vehicle was subjected to; and processing, by the system, the one or more adverse events to identify at least one maintenance service for the autonomous vehicle, wherein the second smart contract is executed for the at least one maintenance service.

12. The system according to claim 11, wherein the method further comprises the steps of:
receiving, by the system, a maintenance request from the autonomous vehicle, wherein the maintenance request comprises diagnostic data from an On-Board Computing (OBC) device of the autonomous vehicle;
retrieving, by the system, a past maintenance data of the autonomous vehicle; and
analyzing, by the system, the diagnostic data, and the past maintenance data to identify at least one second maintenance service for the autonomous vehicle, wherein the second smart contract is processed, for the at least one second maintenance service.

13. The method of claim 1, wherein the one or more maintenance services are autonomously derived from the inspection data based on predefined preferences and contracts with an owner of the autonomous vehicle.

14. The method of claim 1, wherein system is configured to receive inspection and completion data from the inspection unit, the first service unit and the second service unit, wherein the inspection and completion data are mapped to a structured maintenance requirements in a smart contract, the smart contract is with an owner of the autonomous vehicle.

15. The method of claim 1, wherein the smart contracts are generated autonomously by the system.

* * * * *